United States Patent [19]
Brandt

[11] Patent Number: 5,224,091
[45] Date of Patent: Jun. 29, 1993

[54] METHOD FOR MONITORING A TRANSMISSION SYSTEM WHICH COMPRISES A PLURALITY OF VIRTUAL, ASYNCHRONOUSLY TIME-SHARED TRANSMISSION CHANNELS VIA WHICH A DATA FLOW CAN BE TRANSMITTED

[75] Inventor: Dick Brandt, Voorburg, Netherlands

[73] Assignee: Koninklijke PTT Nederland N.V., Groningen, Netherlands

[21] Appl. No.: 591,699

[22] Filed: Oct. 2, 1990

[30] Foreign Application Priority Data

Oct. 9, 1989 [NL] Netherlands ............... 8902504

[51] Int. Cl.$^5$ .............................. H04J 1/16
[52] U.S. Cl. ........................ 370/13; 370/17; 370/85.6; 340/825.5
[58] Field of Search ............ 370/85.01, 85.1, 13, 370/17, 94.1, 85.6, 60; 340/825.02, 825.5, 825.51; 455/115, 198; 371/21.4, 21.5, 21.3, 20.1, 20.4

[56] References Cited

U.S. PATENT DOCUMENTS

| | | | |
|---|---|---|---|
| 4,956,772 | 9/1990 | Neches | 364/200 |
| 4,979,100 | 12/1990 | Makris et al. | 364/200 |
| 4,993,022 | 2/1991 | Kondo et al. | 370/85.6 |
| 5,010,332 | 4/1991 | Egami | 370/85.6 |

FOREIGN PATENT DOCUMENTS 0275678  7/1988  European Pat. Off.

OTHER PUBLICATIONS

1986 International Zurich Seminar On Digital Communication, "New Directions in Communication".

*Primary Examiner*—Douglas W. Olms
*Assistant Examiner*—Dang Ton
*Attorney, Agent, or Firm*—Frishauf, Holtz, Goodman & Woodward

[57] ABSTRACT

For monitoring a transmission system comprising a number of asynchronously operating channels through which data cells can be transmitted, variable values are stored which, on arrival of a data cell, are altered by an alteration algorithm in accordance with data cell traffic and are then processed by an evaluation algorithm to produce an evaluation signal. Such evaluation signals are processed by a combination algorithm to produce a control signal. A data cell is or is not, transmitted, depending on the value of the control signal. Quality classes are assigned to the data cells and for each quality class a first variable value is stored, which is altered by a first alteration algorithm when a data cell arrives at a first location and is processed by a first evaluation algorithm to produce a first evaluation signal. The channels are divided into groups, each comprising those channels which use a particular potential congestion point in the transmission system. For each group of channels a second variable value is stored, which is altered by a second alteration algorithm when a data cell arrives at a second location and is then processed by a second evaluation algorithm to produce a second evaluation signal. Depending on the value of the second evaluation signal and depending on the value of the respective quality class, the first alteration algorithm or the first evaluation algorithm or both are so controlled that the number of data cells transmitted is reduced and this the more for data cells of lower the quality classes.

5 Claims, 5 Drawing Sheets

METHOD FOR MONITORING A TRANSMISSION SYSTEM WHICH COMPRISES A PLURALITY OF VIRTUAL, ASYNCHRONOUSLY TIME-SHARED TRANSMISSION CHANNELS VIA WHICH A DATA FLOW CAN BE TRANSMITTED

A. BACKGROUND OF THE INVENTION

1. Field of the invention

The invention relates to a method for monitoring a transmission system which comprises a plurality of virtual, asynchronously time-shared transmission channels via which a data flow can be transmitted, which data flow is composed of data cells which are each transmitted by one of said transmission channels and which each comprise a control word group containing one or more control words and also an information word group containing one or more information words; in which method a number of variables is maintained which, on arrival of a data cell at a certain location, are each altered in accordance with a alteration algorithm and are then processed in accordance with an evaluation algorithm to produce an evaluation signal; in which method one or more of such evaluation signals are processed in accordance with a combination algorithm to produce a control signal and in which method a data cell is, or is not, transmitted, depending on the value of the control signal.

2. Prior art

A method as defined above is disclosed by the European Patent Application 90202268.0 in the name of the Applicant. A method is described therein for monitoring a transmission system containing a plurality of virtual, asynchronously time-shared transmission channels by means of a monitoring device. When a data cell appears at the monitoring device, a number of control and setting values with which the monitoring device is set are derived from the control word group of a data cell appearing at the monitoring device. In this way, it is possible, by means of the control word group, to make a choice from a number of variable values and, furthermore, from various parameters and algorithms with which said variable values are altered and with which the altered variable values are then evaluated. The evaluation algorithms are essentially criteria for evaluating a variable value so as to decide between alternatives, the alternatives actually being a choice between other variable values or a set of variable values, while the alternation algorithms are criteria for changing the variable values. It is also possible to deduce from the control word group the way in which the diverse evaluation results have to be combined to produce a control signal (or a plurality of control signals) which ultimately controls the access of the data cell to the downstream transmission system, in particular by means of a switching unit which, depending on the value of the control signal generated, transits, or does not transmit, the data cell concerned to the (further) transmission system.

B. SUMMARY OF THE INVENTION

The object of the present invention is to extend the said patent application filed by the Applicant, provision being made therein, in particular, that, if at a particular point (a bottleneck) in the transmission system, the number of data cells is too large, which threatens to produce congestion at that point, this is detected in time and counteracted, viz by reducing, delaying or even stopping the influx of data cells to that congestion point as long as the threat of congestion continues and by doing this in a selective way, viz. depending on the quality classes which are assigned to the various data cells presented.

According to the invention, the virtual transmission channels, which are intended to make use of a particular potential congestion point, are combined to form a group of (virtual) transmission channels Such a group may therefore comprise one or more transmission channels, while one transmission channel may form part of one or more groups For each group, the number of data cells presented at a particular location is accessibly stored and it is established on the basis thereof—by means of generating an evaluation signal with the aid of an evaluation algorithm in which, for example, the maximum permissible number of data cells at the potential congestion point occurs as a parameter—whether or not there is a threat of congestion at the potential congestion point concerned.

Furthermore, according to the invention, quality classes are assigned to the data cells. These classes can be assigned for each individual data cell directly or indirectly, for example, collectively, for each virtual channel. A group of channels therefore comprises data cells having—as a rule—a plurality of different quality classes. A quality class occurs—as a rule—in a plurality of channel groups, but may also occur in only one channel group or—for example, temporarily—in not a single one. The term "quality" corresponds to the term "quality of service (QOS)" employed in specialist circles: this comprises, inter alia, the maximum risk of loss and/or delay which can be guaranteed. The QOS plays a decision-making role if a choice has to be made between two data cells. For example, it may be necessary to choose which of two data cells—the one at the expense of the other—may be transmitted ("loss priority") or which of the two has the right to the shortest delay ("delay priority").

The above-mentioned rules make it possible, in the event of the threat of congestion at a particular potential congestion point—which is detected by the storage of the total number of data cells associated with the group of channels concerned and the evaluation of said number with the aid of the said evaluation algorithm to counteract said threat of congestion by selectively reducing the influx of data cells associated with said group of channels, taking into consideration the different quality classes assigned to the data cells. In the event of a threat of congestion, data cells from the group of channels whose data cells are visiting the congestion point, having a lower quality class, are in the first instance excluded by temporarily—as long as there is a threat of congestion—not transmitting them or only transmitting them in smaller numbers or by delaying the transmission thereof, which is achieved, according to the invention, by increasing—under the control of the evaluation signal generated under the influence of the total number of data cells for each group of channels—as it were, the transmission or delay "threshold" (or both) for data cells having a lower quality class (in other words, by making the criterion more severe) in the event of a threat of congestion. This selective "feedback" prevents the possibility that data cells having a higher quality class might be rejected by the system, while data cells having a lower quality class might be transmitted. However, in the event of a serious congestion or threat of congestion, the threshold is also increased for data cells having a higher quality; it is also possible, in the event of a threat of congestion, to increase the thresholds for all the data cells of said group of channels, but this will be all the more so, the lower the quality class is.

For simplicity of expression, the term "variable value" is henceforth replaced by the term "variable".

To summarize, the method according to the invention is characterized in that one from more quality classes is assigned to each of the data cells and in that, for each quality class, a first variable is stored which relates to the number of data cells having that respective quality class, which first variable is altered in accordance with a first alteration algorithm when a data cell arrives at a first location (I) and is processed in accordance with a first evaluation algorithm to produce a first evaluation signal;

in that each of the virtual transmission channels is divided into one or more groups each comprising one or more of said transmission channels, which groups each comprise those virtual transmission channels which make use of a particular potential congestion point in the transmission system and in that, for each group of virtual transmission channels, a second variable is stored which relates to the number of data cells to be transmitted via the respective group of transmission channels, which second variable is altered in accordance with a second alteration algorithm when a data cell arrives at a second location (I,II,III) and is processed in accordance with a second evaluation algorithm to produce a second evaluation signal;

in that, depending on the value of the second evaluation signal and depending on the value of the respective quality class, the first alteration algorithm or the first evaluation algorithm or both are controlled such that, if the number of data cells of the respective group of channels is relatively large, the number of data cells transmitted is reduced and this the more so according as the quality class is lower.

As far as the first variable and the second variable are concerned, the locations where the appearance of data cells is detected for the purpose of maintaining the respective variables may both be situated—considered on the basis of the transmission direction of the data cells —on the same side, i.e. before the potential congestion point (the second location (II) may even coincide completely with the first location (I)), or on either side thereof, i.e. the first location—where the number of data cells is detected for each quality class—before (upstream of) the congestion point (so that they can be held back in time in the event of a threat of congestion) and the second location—where the number of data cells is detected for each group of channels—after (downstream of) the potential congestion point. If the transmission system comprises a plurality of (separate) physical transmission channels at the first location, according to a further embodiment of the invention, provision is preferably made that, for all those physical transmission channels (a,b,c,d) or a number thereof, for each quality class one and the same first variable is maintained which is altered when a data cell having the respective quality class appears at said first location (I) via one of the physical transmission channels and which is then processed to produce one and the same first evaluation signal. If the transmission system comprises a plurality of (separate) physical transmission channels at the second location, according to a further embodiment of the invention, provision is preferably made that, for all those physical transmission channels (a,b,c,d; A,B,C,D; U,V,W,X) or a number thereof, for each group of virtual transmission channels one and the same second variable is maintained, which is altered when a data cell which belongs to the respective group of virtual transmission channels appears at that second location (I,II,III) via one of the said physical transmission channels and which variable is then processed to produce one and the same second evaluation signal.

C. REFERENCES

EP 90202268.0 [KONINKLIJKE PTT NEDERLAND NV]

D. EXEMPLARY EMBODIMENTS

Figure 1:
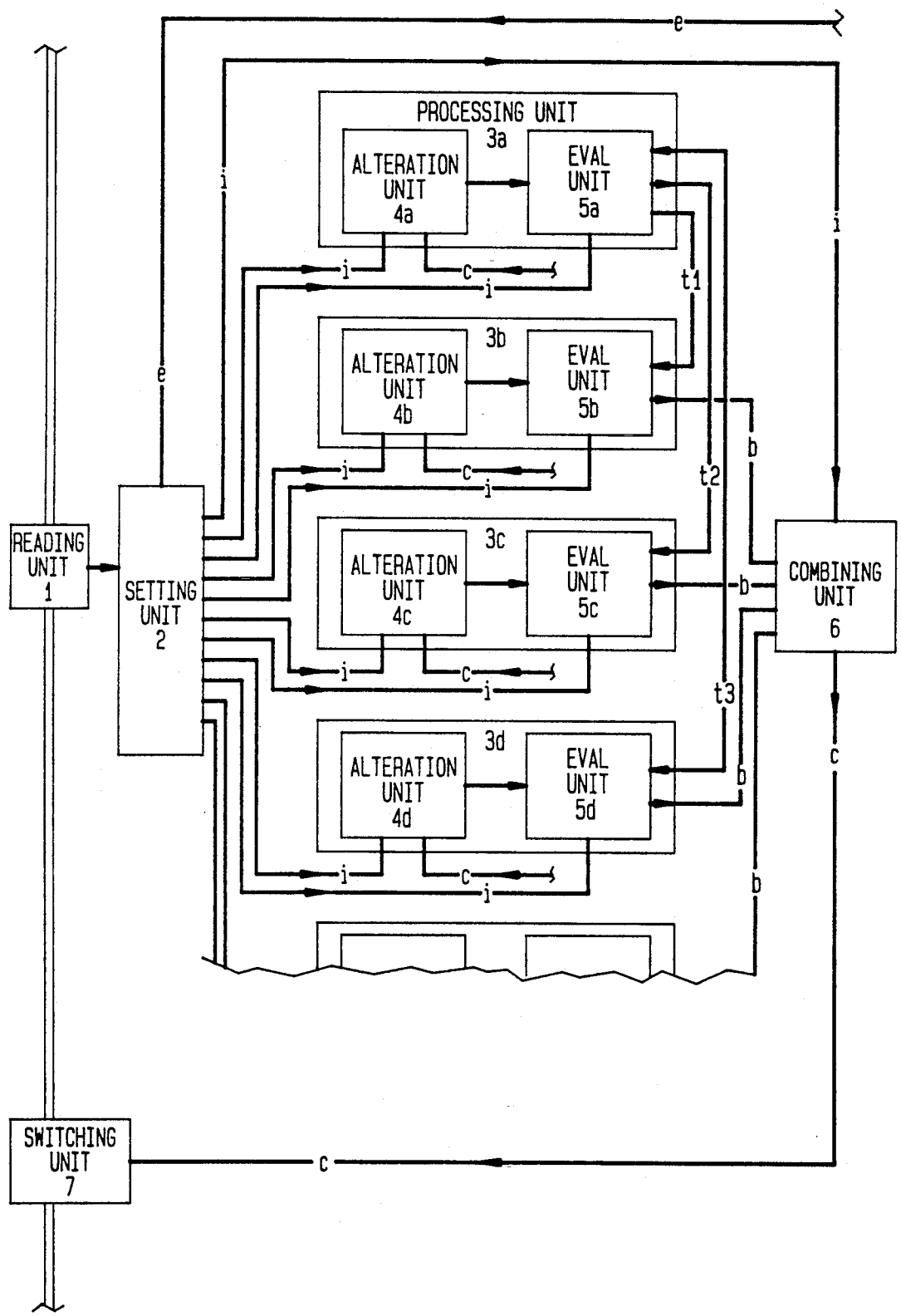
FIG. 1 is a circuit block diagram of a device in which the method according to the invention can be performed.

FIG. 1 shows a device in which the method according to the invention can be pre-eminently executed and which essentially corresponds to the device which has been described in the above-mentioned application filed by the Applicant. After reading out the control word group of a data cell which appears into a reading unit 1, a number of variables are altered, under the control of an setting unit 2, which are stored in a number of alteration units 4 (a,b,c,d, etc.). The stored variables are then processed in evaluation units 5 (a,b,c,d, etc.) to produce evaluation signals (b)—which in fact provide an evaluation of the respective (altered) variable on the basis of certain evaluation criteria—which evaluation signals are then combined in a combination unit 6 to produce a control signal (c)— which is in fact an "overall" evaluation signal—which determines whether the data cell may, or may not (or temporarily not, but in fact delayed), be transmitted by a switching unit 7 to a transmission system situated downstream of said switching unit 7.

The control word group read out by the reading unit 1 is used in the setting unit 2, inter alia, to deduce the channel to which the data cell belongs; in this process, which channel group or groups—corresponding to one or more potential congestion points in the downstream transmission system—said channel (and therefore also said data cell) belongs to is determined. From the control word group the quality class or classes (for example, one relating to the "loss priority" and one relating to the "delay priority") assigned to the data cell is also deduced. The alteration units 4 (a,b,c,d, etc.) serve to alter, according to the respective alteration algorithms—for example, as indicated by the setting unit 2—the respective variables of which a first relates to the total number of data cells per channel group (deduced from the control word group), a second to the number of data cells from that channel group which has a quality class I, a third to the number of data cells of that channel group which has a quality class II and a fourth to the number of data cells of that channel group which has a quality class III, etc. However, it is possible to alter more than one variable per item mentioned (for example, one relating to the overall total, one relating to the long-term average, one relating to the short-term average, etc.). The setting unit 2 determines (for example) that alteration unit 4a is used to alter the said first variable, 4b for the second variable, 4c for the third variable and 4d for the fourth variable. To generate evaluation signals, whose value provides an evaluation of the value of the respective altered variables, the respective altered variables are presented to the evaluation units 5 (a,b,c,d, etc.) which generate various evaluation signals on the basis of said variables and—for example, as indicated by the setting unit 2—evaluation algorithms which comprise evaluation criteria such as, in particular, the maximum ("threshold") value of the respective variable: a first evaluation signal relating to the total number of data cells in the channel group indicated by the data cell, a second evaluation signal relating to the number of data cells in that group which has quality class I, a third relating to the number in that group which has quality class II and a fourth relating to the number in that group which has quality class III. In this embodiment, the number of data cells per channel group and the number for each quality class is therefore measured at one and the same location. Since what is maximum loading (for example, calculated in maximum permissible number of data cells for a certain time interval) of the potential congestion point (bottleneck) via which all the data cells which belong to the respective channel group has been introduced into the evaluation algorithm of the first evaluation unit 5a, it is possible to deduce from the first evaluation signal when congestion will start to occur if the loading increases. As indicated in the figure, in order to counteract this, a feedback signal (t1,t2,t3) deduced from the first evaluation signal is presented to the evaluation units 5b, 5c and 5d which generate an evaluation signal on the basis of quality classes. Said first evaluation signal is used to alter the evaluation algorithm of evaluation unit 5d—in accordance with the lowest quality class III—in a manner such that, as it were, the threshold for data cells having the lowest quality class III is increased, as a result of which that type of data cell is not admitted, or is admitted only to a very limited extent, to the downstream system. The effect of this is that the loading of the potential congestion point decreases. If this decrease is insufficient (for example, because the number of data cells having a higher quality class increases more than the number of data cells having the lowest quality class decreases), the evaluation algorithm of the evaluation unit 5c—in accordance with the lowest but one quality class II—is also altered by means of the said control signal (t) such that the threshold for data cells having said quality class II is also increased (made more severe). It is also possible to alter all the evaluation algorithms simultaneously whenever there is a threat of congestion and specifically such that the threshold is made all the more severe, the lower the quality class is. Furthermore, it is possible to arrange for the setting of the various evaluation algorithms related to the quality classes to depend on which type of data cells (that is to say, having which quality class) are making the greatest contribution to the loading at the congestion point; it is possible then to repress to the greatest degree—taking account, however, of the various quality classes—in particular that type of data cells which are the greatest cause of the (threat of) congestion, viz. by increasing the access threshold for precisely those data cells.

Figure 2:
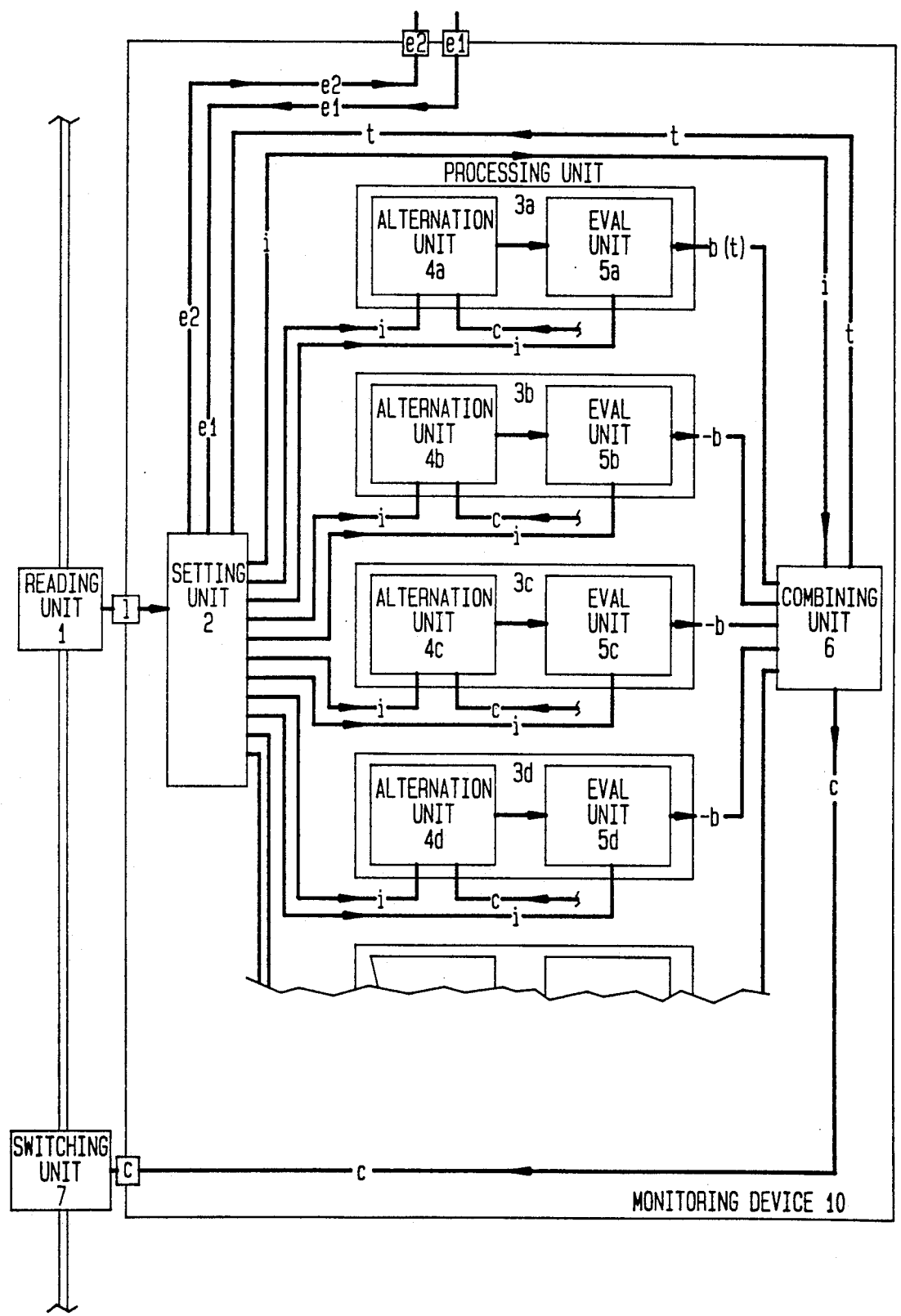
FIG. 2 is a diagram of monitoring device of corresponding to FIG. 1.

FIG. 2 shows a monitoring device 10 corresponding to FIG. 1, but in which the setting of the evaluation algorithms in the units 5c, 5c and 5d is regulated via the combination unit 6 and the setting unit 2 in order to achieve, in the practical implementation, a better modular construction of the device, in particular as regards the processing units 3 (a,b,c,d, etc.), formed by the respective alteration units 4 and the evaluation units 5, which are all able to be of similar construction as a result. In this embodiment, the algorithms of the evaluation units 5b ... 5d are set (fed back)—in the event of a threat of congestion—by converting, in the combination unit 6, the evaluation signal b(t) generated by the first evaluation unit 5a into a feedback signal (t) and feeding this to the setting unit 2. In the setting unit 2, the parameters of the alteration units 4 and the evaluation units 5 are set; the value of the feedback signal (t) is now involved in setting the evaluation units 5b ... 5d as a result of which the evaluation algorithms of said evaluation units, and consequently the access thresholds represented by said algorithms, are affected by means of said signal. However, it is also possible to arrange for the alteration algorithms, instead of the evaluation algorithms, to be affected by the feedback signal in a manner such that the variable to be altered by said algorithm is increased, for example, to an additional extent; with a constant evaluation algorithm, this has the same effect as if the variable were to be increased to the normal extent and the evaluation "threshold" were to be made more severe. It is, of course, also possible to arrange for the algorithms of both types of units (4 and 5) to be affected simultaneously by the feedback signal.

Figure 3:
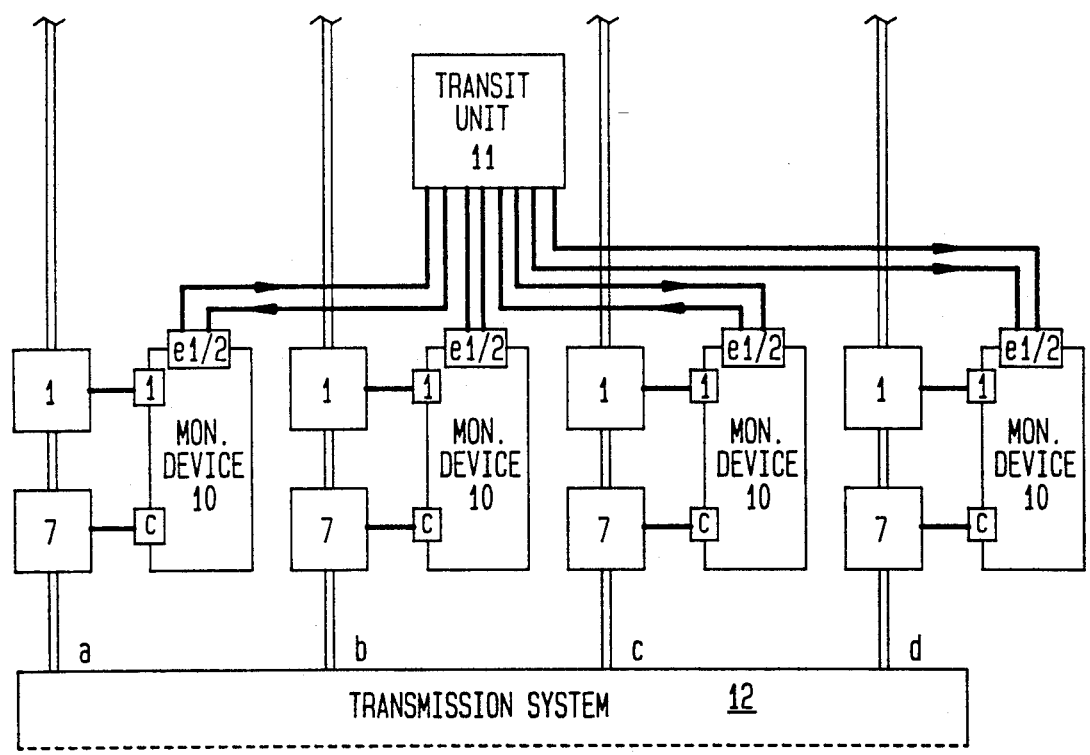
FIG. 3 is a diagram showing how two monitoring devices can operate together.

FIG. 2 furthermore shows two external connections e1 and e2 by means of which signals (parameters) can be fed from the outside to the setting unit 2 or by means of which signals—in particular, the feedback signal (t) or a signal derived therefrom—can be fed to the outside, for example to another monitoring device, as shown in FIG. 3, in order to enable a plurality of monitoring devices 10 to work together with one another.

FIG. 3 shows a transmission system 12 having a plurality of hierarchically equivalent, but physically separated from one another, inputs (a,b,c,d). Each of the inputs is monitored by a monitoring device 10 such as was shown in the preceding figure. The external connections e1/e2 (indicated by "e ↕" in this figure) of the devices 10 come together in a transit unit The function of said transit unit 11 is to make provision for the monitoring devices—which each control only the access to one physical input channel—to take account not only of the data cells which are presented to the system 12 via the physical channel they monitor but also of the data cells presented via the other physical channels in generating their evaluation signals and control signal (which actuate their switching unit 7). In this process it is possible that the transit unit 11 plays a somewhat passive role and always transmits the external outgoing signals (e2) originating from the respective setting units 2 (not shown in this figure), of the various devices 11 to the other setting devices 2 (external incoming signals e1) so that account is taken of all the data cells presented via the various, physically separated input channels in the alteration units and/or evaluation units of all the monitoring devices 10. It is also possible for the transit unit 11 to play a more active role and even to totalize—on the basis of the outgoing external signals e2—the number of data cells of the various input channels and to feed—via the ingoing external signal e1—a correction signal to the other devices 10 on the basis thereof.

Figure 4:
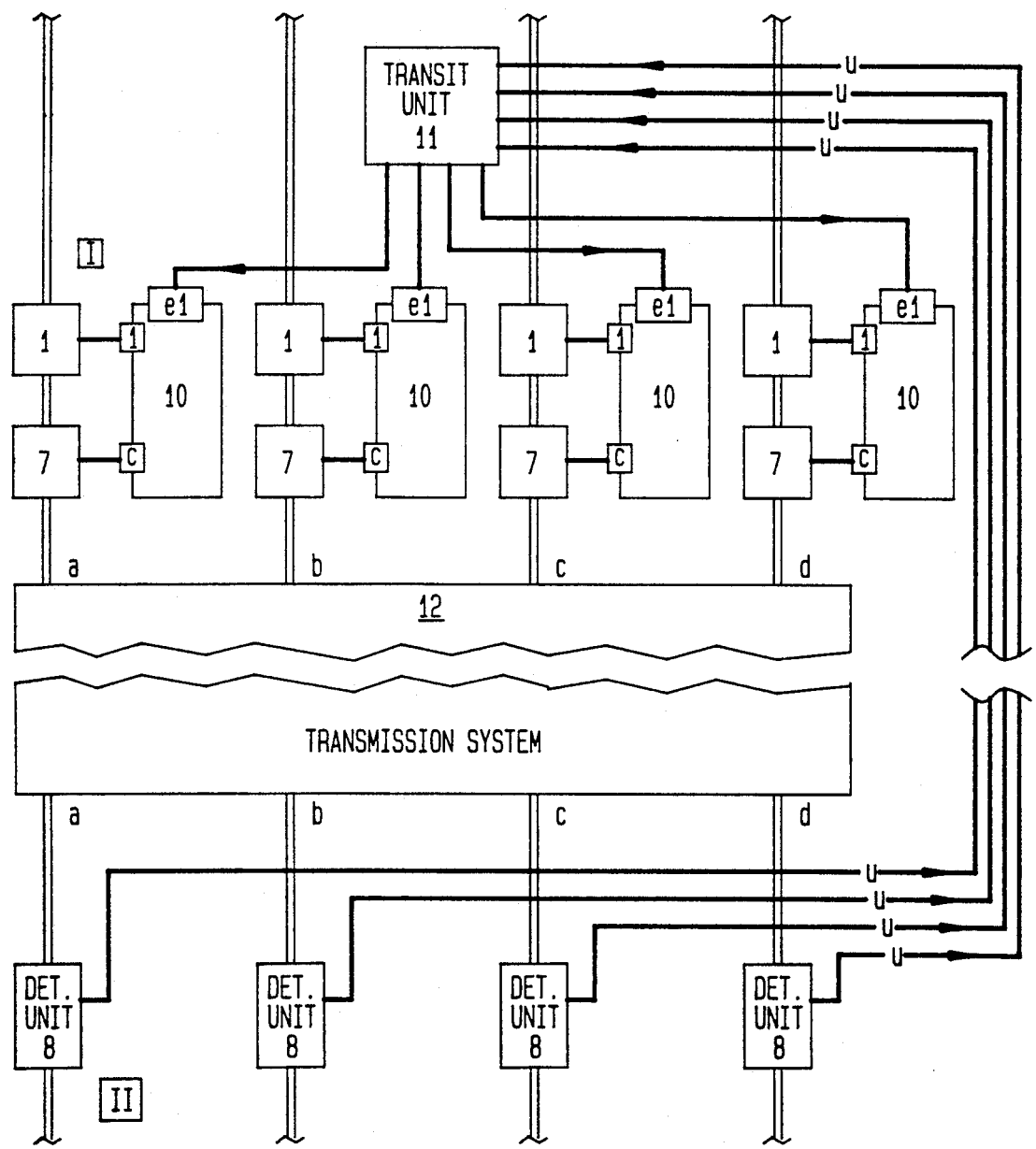
FIG. 4 is a diagram of transmission system 12 which is monitored by device 10 each for one physical input channel.

FIG. 4 shows an exemplary embodiment in which the transmission system 12—as in FIG. 3—is monitored by means of a number of monitoring devices 10, each for one physical input channel (a,b,c,d), but in which the total number of data cells for each (potential) congestion point is not logged upstream of said congestion point (considered in the direction of the data flow), as in the preceding exemplary embodiments, but downstream of it. The exemplary embodiment shown in this figure comprises a number of detection units 8, viz. one per physical output (A,B,C,D) of the transmission system 12. In this case, each output (A,B,C,D) is considered to be connected to one potential congestion point. It is, of course, also possible for, for example, two outputs to be connected to one and the same potential congestion point. In the detection units 8, the number of data cells which is transmitted by the respective output channel is detected The detection units 8 therefore fulfill a role which corresponds to that of the reading unit i, but it is not necessary for the contents of the control words to be read out by the detection units 8. The count signal (u) generated by the detection units 8 therefore gives an indication of the number of data cells passing through the respective output; this may be the total number or, for example, the average number over a particular interval of time. Instead of the number of data cells, it is also possible to detect the number of vacancies in the data flow ("vacant data cells"): the threat of congestion is then detected if the number of vacant data cells is, for example, zero during a particular time or approaches zero. The count signal (u) generated in this way is fed to the transit unit il which feeds the respective count signals originating from the detection units 8 to the first processing units 3a (shown in the preceding figures). Let each of the outputs A,B,C and D be a potential congestion point. The count signal (u) of, for example, output A will then be presented to the setting unit 2 (not shown) of each monitoring device via the transit unit 11. The setting device 2 then alters the variable belonging to the group of channels intended for output A (which variable therefore represents the number of data cells intended for output A) in the alteration unit 4a and subsequently evaluates it in the evaluation unit 5a. The count signals of the outputs B, C and D also potential congestion points—are processed in the same way; the processing thereof in the monitoring devices 10 should, in fact, be carried out (preferably) in processing units 3 other than those already mentioned, for example processing units 3e, 3f and 3g, the position of which in the monitoring devices 10 can be deduced in an obvious manner. If more outputs (for example B and C) are considered to represent one potential congestion point in the transmission system 12, the number of data cells which is transmitted by those two outputs are combined by, for example, combining count signals (u) originating from the respective detection units 8 of the outputs B and C in the transit unit 11.

Figure 5:
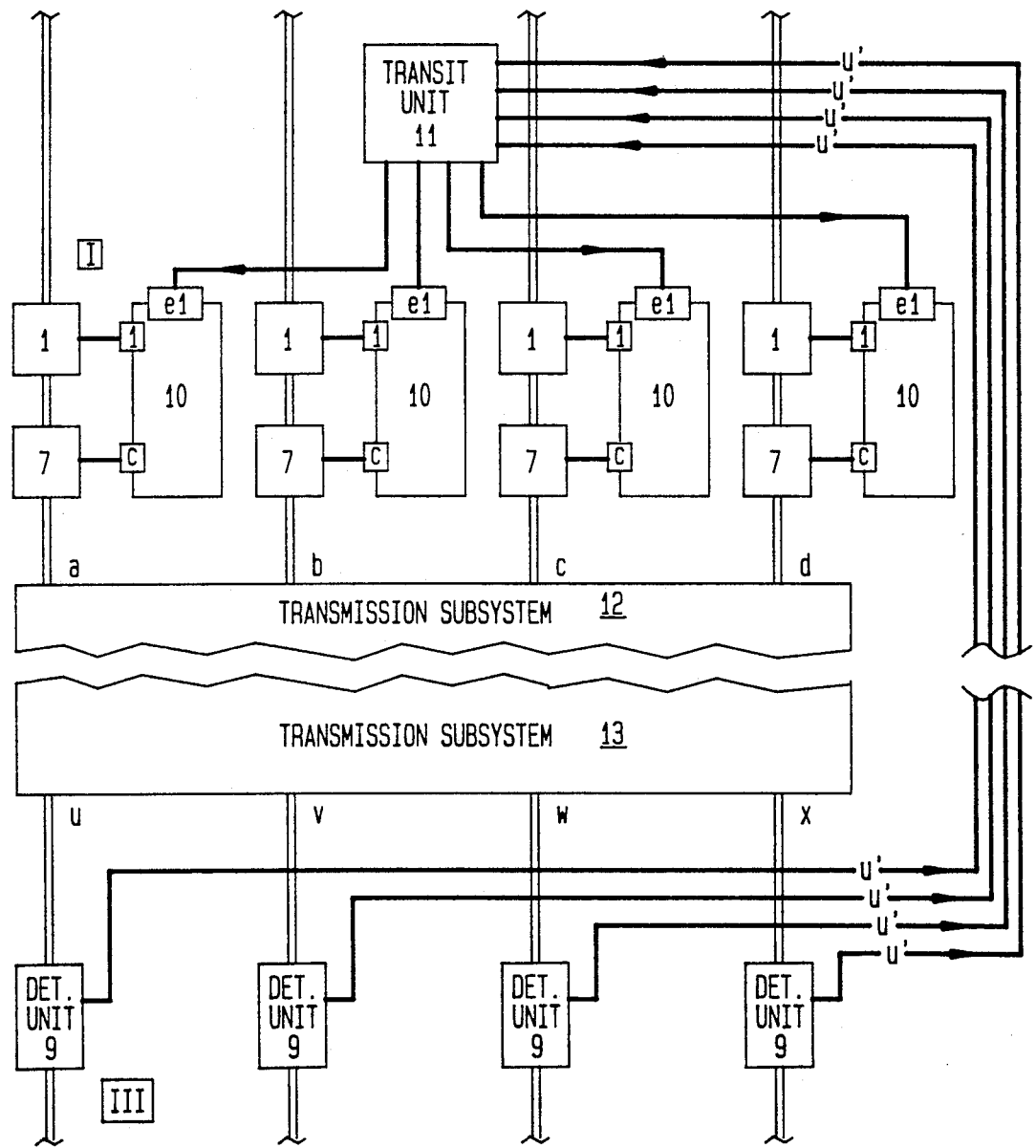
FIG. 5 shows a transmission system 12 which is regarded as a part of a larger transmission system in which a sub-transmission system 13 has outputs regarded as potential congestion points.

Finally, it is pointed out that it is also possible to site detection units corresponding to the said detection units 8 in locations situated further away in the transmission system (if the transmission system 12 shown is regarded as a part of a larger transmission system). This is illustrated by FIG. 5 in which a (sub) transmission system 13 is furthermore shown which has outputs U,V,W and X (location III) which are all regarded as a potential congestion point and which are all provided with a detection unit 9 (corresponding to the detection units 8), the Count signals u' of which are fed to the transit unit 11 and processed in the same way as the count signals u. However, as an alternative for this exemplary embodiment, it is also possible to effect—in accordance with the exemplary embodiments shown in FIGS. 2 and 3—the detection of data cells, having a particular potential congestion point in said transmission system (in a wider sense) as destination, at a location upstream of said congestion point.

I claim:

1. Method for monitoring a transmission system which comprises a plurality of virtual, asynchronously time-shared transmission channels via which a data flow can be transmitted, which data flow is composed of data cells which are each transmitted via one of said transmission channels and which each comprise a control word group containing one or ore control words and also an information word group containing one or more information words; in which said method a number of variable values are stored which, on arrival of a data cell at a certain location, are each altered in accordance with an altertion algorithm for altering a stored variable value and are then processed in accordance with an elevation algorithm for selecting between available evaluation signals to produce an evaluation signal; in which said method one or more of such evaluation signals are processed in accordance with a combination algorithm for selection between available control signals to produce a control signal and in which said method a data cell is, either transmitted, or is not transmitted, depending on the value of the control signal, characterized in that one from a plurality of quality classes 1 assigned to each of the data cells and in that, for each quality class, a first variable value is stored which relates to the number of data cells having that respective quality class which first variable value is altered in accordance with a first alteration algorithm when a data cell arrives at a first location (I) and is processed in accordance with a first evaluation algorithm to produce a first evaluation signal;

in that each of the virtual transmission channels id collected int one or more groups each comprising one or ore of said transmission channels, which groups each comprise those virtual transmission channels which make use of a particular potential congestion point in the transmission system and in that, for each group of virtual transmission channels, a second variable value is stored which relates to the number of data cells to be transmitted via the respective groups of transmission channels, which second variable value is altered in accordance with a second alteration algorithm when a data cell arrives at a second location and is processed in accordance with a second evaluation algorithm to produce a second evaluation signal; and in that, depending on the value of the second evaluation signal and depending on the value of the respective quality class, the first alternation algorithm or the first evaluation algorithm or both are controlled so that the number of data cells transmitted is reduced the more so accordingly as the number of data cells of the respective group is larger and the more so accordingly as the quality class assigned to the cells is lower.

2. Method according to claim 1, characterized in that said first location and said second location are both situated, considered on the basis of the flow direction of the data cells, upstream of the respective potential congestion point.

3. Method according to claim 1, characterized in that said first location (I) is situated, considered on the basis of the flow direction of the data cells, upstream of the respective potential congestion point and said second location (II,III) is situated downstream of the respective potential congestion point.

4. Method according to claim 1, in which the transmission system comprises a plurality of physical transmission channels at said first location, characterized in that, for all those physical transmission channels (a,b,c,d) or for a number thereof, for each quality class one and the same first variable value is stored, which is altered when a data cell having the respective quality class appears at said first location (I) via one of those physical transmission channels and which is then processed to produce one and the same first evaluation signal.

5. Method according to claim 1, in which the transmission system comprises a plurality of physical transmission channels at said second location, characterized in that, for all those physical transmission channels (a,b,c,d; A,B,C,D, U,V,W,X) or for a number thereof, for each group of virtual transmission channels one and the same second variable value is stored, which is altered when a data cell which belongs to the respective group of virtual transmission channels appears at said second location (I,II,III) via one of those physical transmission channels and which is then processed to produce one and the same second evaluation signal.

* * * * *